(12) United States Patent
Ushikoshi

(10) Patent No.: US 6,632,154 B2
(45) Date of Patent: Oct. 14, 2003

(54) GEAR APPARATUS

(75) Inventor: Kenichi Ushikoshi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 22 days.

(21) Appl. No.: 09/936,982

(22) PCT Filed: Jan. 17, 2001

(86) PCT No.: PCT/JP01/00282

§ 371 (c)(1),
(2), (4) Date: Sep. 18, 2001

(65) Prior Publication Data

US 2003/0036455 A1 Feb. 20, 2003

(30) Foreign Application Priority Data

Jan. 21, 2000 (JP) .......................... 2000-13094
Mar. 15, 2000 (JP) .......................... 2000-73088
Mar. 15, 2000 (JP) .......................... 2000-73089

(51) Int. Cl.[7] .............................. F16H 57/08
(52) U.S. Cl. ............ 475/338; 475/341; 475/342; 475/904
(58) Field of Search ............... 475/331, 338, 475/341, 342, 346, 348, 904

(56) References Cited

U.S. PATENT DOCUMENTS

| | | | | |
|---|---|---|---|---|
| 3,453,906 A | * | 7/1969 | Ito | 475/342 |
| 4,142,426 A | * | 3/1979 | Baranyi | 475/342 X |
| 4,280,376 A | * | 7/1981 | Rosen | 475/342 |
| 4,365,899 A | * | 12/1982 | Ushikoshi et al. | 368/220 |
| 4,366,727 A | * | 1/1983 | Jonsson | 475/342 |
| 4,850,247 A | * | 7/1989 | Yu | 475/342 |
| 4,864,893 A | * | 9/1989 | Hori | 475/341 |
| 5,366,423 A | | 11/1994 | Mori et al. | |

FOREIGN PATENT DOCUMENTS

| | | | | |
|---|---|---|---|---|
| DE | 4234873 | * | 4/1994 | 475/342 |
| EP | 274089 | * | 7/1988 | 475/342 |
| EP | 323858 | * | 7/1989 | 475/342 |
| JP | 358024642 | * | 2/1983 | 475/342 |
| JP | 401316545 | * | 12/1989 | 475/342 |
| JP | 401316546 | * | 12/1989 | 475/342 |
| JP | 40235238 | * | 2/1990 | 475/331 |
| JP | 403223547 | * | 10/1991 | 475/342 |
| JP | 08-170694 | | 7/1996 | |
| JP | 11-303950 | | 11/1999 | |

OTHER PUBLICATIONS

M. Senmami, "Haguruma, vol. 10", Nikkan Kogyo Shinbunsha, Nov. 30, 1967 (Nov. 30, 1967) pp. 3777 to 3778, 3934–3936; Fig. 9.2(a); Table 9.41.

* cited by examiner

Primary Examiner—Charles A. Marmor
Assistant Examiner—Ha Ho
(74) Attorney, Agent, or Firm—Rosalio Haro

(57) ABSTRACT

A gear train has a sun gear with a tooth count e, n (where n is a natural number of 2 or more) planetary gears having a first gear part with a tooth count $z_1$ meshing with the sun gear and a second gear part with a tooth count $z_2$, a fixed internal tooth gear with a tooth count $I_1$ meshing with the first gear part of the planetary gears, and a movable internal tooth gear with a tooth count $I_2$ meshing with the second gear part of the planetary gears, where tooth counts e, $z_1$, $z_2$, $I_1$ and $I_2$ are each a multiple of n. Even if the gear form of each gear has a small module, a planetary gear train mechanism can be configured without raising operating or assembly problems, and it can be miniaturized more than conventional gear trains while still have a sufficient gear reduction ratio.

10 Claims, 4 Drawing Sheets

GEAR APPARATUS

TECHNICAL FIELD

The present invention relates to a gear train, and relates particularly to the configuration of a gear train having a planetary gear train mechanism suitable for configuring a small speed reducer.

PRIOR ART

Speed reducers using a planetary gear train mechanism are widely used in the drive mechanism of various types of mechanical devices because they are generally compact and achieve a high gear reduction ratio. An example of this type of speed reducing apparatus is the compact speed reducer disclosed in Japanese Patent Laid-Open Publication (kokai) H2-31047. This compact speed reducer has a sun gear, a planetary gear meshing with the sun gear, a fixed internal tooth gear meshing with a first gear part of the planetary gear, and a movable internal tooth gear coaxial to the fixed internal tooth gear and meshing with a second gear part of the planetary gear. The first gear part meshing with the fixed internal tooth gear and the second gear part meshing with the movable gear part are disposed coaxially and mutually adjacent in the axial direction, and are described in kokai H2-31047 as having the same number of teeth. The first gear part and second gear part of the planetary gear, however, generally have different numbers of teeth.

The gear reduction ratio can be greatly increased in a gear train having this type of planetary gear train mechanism without incurring an increase in the size of the mechanism. For example, if in the above-cited mechanism e is the tooth count of the sun gear, $z_1$ is the tooth count of the first gear part of the planetary gear, $z_2$ is the tooth count of the second gear part of the planetary gear, $I_1$ is the tooth count of the fixed internal tooth gear, $I_2$ is the tooth count of the movable internal tooth gear, the sun gear is the input part, and the movable internal tooth gear is the output part, the gear reduction ratio can be written as $$r = \{1+(I_1/e)\}/\{1-(z_2/z_1)*(I_1/I_2)\} \quad (1)$$

As described in kokai H2-31047, if $z_1 = z_2$, sun gear tooth count $e=6$, fixed internal tooth gear tooth count $I_1=60$, and movable gear tooth count $I_2=61$, the difference in the tooth counts of the fixed internal tooth gear and movable internal tooth gear is 1, and the gear reduction ratio is 671. If the other tooth counts remain the same and the tooth count $I_2$ of the movable internal tooth gear is 62, the tooth count difference is 2 and the gear reduction ratio is 341. If the other tooth counts remain the same and the tooth count $I_2$ of the movable internal tooth gear is 63, the tooth count difference is 3 and the gear reduction ratio is 231, and if the tooth count $I_2$ of the movable internal tooth gear is 64, the tooth count difference is 4 and the gear reduction ratio is 176.

However, if the difference between the tooth count of the fixed internal tooth gear and the tooth count of the movable internal tooth gear is 1 in a gear train using a planetary gear train mechanism in which the tooth counts $z_1$ of the first gear part and $z_2$ of the second gear part of the planetary gear are the same as described above, the number of planetary gears that can be assembled between the sun gear and the fixed internal tooth gear and movable internal tooth gear is n=1. As a result, the sun gear and planetary gear always mesh at only one place (one tooth each), the torque applied to the teeth becomes very high and the load on the gears becomes great, leading to problems of reduced durability and difficulties in the miniaturization of the gears due to the requirement for increased tooth strength. Practical implementation is therefore difficult particularly when size is reduced. In addition, when the tooth count difference between the fixed internal tooth gear and movable internal tooth gear is 2 to 4, the number n of planetary gears that can be provided is also 2 to 4, but the gear reduction ratio drops as the above tooth count difference increases. More specifically, using three planetary gears and a tooth count difference of 3 between the fixed internal tooth gear and movable internal tooth gear, the achievable gear reduction ratio of approximately 231 (the value shown in the previously described example) is the design limit. Furthermore, considering variation in tooth profile when the gear module is small, the gear reduction ratio is often only about half that or approximately 100 for safety in an actual, practical implementation. The gear reduction ratio of a gear train using a planetary gear train mechanism is therefore often normally approximately 100, and even in extreme configurations using gear forms with a small module it is still only possible to achieve a practical gear reduction ratio of less than 200.

On the other hand, if the constraint of having the planetary gears $z_1 = z_2$ is removed, the number of planetary gears n is not necessarily dependent upon the tooth count difference between the fixed internal tooth gear and the movable internal tooth gear. Furthermore, according to equation (1) it would seem that an infinitely high gear reduction ratio could be achieved. However, in order to actually construct a small gear mechanism, three conditions must be met: it must be possible to actually form gear forms with the gear module required by the size; it must be possible to achieve the required operating strength (rigidity) in the teeth of the gear forms; and in the positioning of the gears it must be possible to overcome the reduced backlash resulting from the miniaturization of the gear train when interlocking the gears to each other in the assembling the gear train.

The present invention solves the problems described above. An object of the invention is to achieve a configuration for a planetary gear train mechanism suitable for the miniaturization of a gear module that does not introduce problems to its operation or assembly, even when the gear forms of the gears are used in the construction of a small gear module, and thereby provide a gear train that can be made smaller than the prior art while providing a sufficient gear reduction ratio.

SUMMARY OF THE INVENTION

A gear train according to the present invention for resolving the above problems has the following items: a sun gear with a tooth count of e; n planetary gears (where n is a natural number of 2 or more) with each planetary gear having a first gear part with a tooth count of $z_1$ meshing with the sun gear and a second gear part with a tooth count of $z_2$; a fixed internal tooth gear with a tooth count of $I_1$ meshing with the first gear part of the planetary gears; and a movable internal tooth gear with a tooth count of $I_2$ meshing with the second gear part of the planetary gears. The gear train according to the present invention is further characterized by having each of the tooth counts e, $z_1$, $z_2$, $I_1$, and $I_2$ be a multiple of n.

With the present invention it is possible to configure a gear train that has high durability despite miniaturization and that can be reliably and easily assembled because the first gear parts of the n planetary gears between the sun gear and the fixed internal tooth gear can be assembled meshing at equal intervals around the axis, and because the second gear parts of the n planetary gears can be reliably assembled meshed in the same way with the movable internal tooth gear. Thus, a very well balanced condition can be achieved in the planetary gear mechanism even if the gear train is small (i.e. even if the gear module of the gear forms is small) because the phases, i.e. the alignment, of the gear forms at equidistant points dividing the circumference of each gear in n equal parts are mutually matched as a result of the tooth count e of the sun gear, the tooth count $z_1$ of the first gear parts of the planetary gears, the tooth count $z_2$ of the second gear parts of the planetary gears, the tooth count $I_1$ of the fixed internal tooth gear, and the tooth count $I_2$ of, the movable internal tooth gear all being a multiple of n (where n is a natural number of 2 or more). Furthermore, because the present invention has only one constraint requiring that the tooth count of each gear be a multiple of n and because the tooth count of the first gear part and the tooth count of the second gear part of the planetary gears are not required to be the same, the tooth count combinations of a gear train in accord with the present invention can be set more freely and a higher gear reduction ratio can be easily achieved than in the prior art. Moreover, because there are preferably more than two planetary gears, the load on the gears is less as compared with a situation when only one planetary gear is used.

In the present invention n is preferably 2 or 3. Because the section area of the support stud part projecting in the axial direction of the sun gear can be assured in the carrier (or holder) axially supporting the planetary gears as a result of the number of planetary gears being 2 or 3, rigidity loss in the carrier can be suppressed even when the gear train is miniaturized, and the rotational axis of the planetary gear can be reliably supported.

Problems also do not arise in the present invention even when the gear reduction ratio is 200 or greater when the sun gear is the input and the movable internal tooth gear is the output. To achieve a gear reduction ratio is 300 or greater with the above described prior art, the number of planetary gears is normally reduced or it will be difficult to achieve a configuration enabling the gears to be assembled. But with a gear train in accord with the present invention, the gear mechanism can be configured so that it can be reliably assembled without reducing the number of planetary gears even in such cases of gear reduction ratios greater than 300. In particular, with the configuration of the present invention it is possible to achieve a high gear reduction ratio such as noted above and at the same time configure a gear train having sufficiently practical durability and balance even when using gears having a gear form with a small, clock-size module (for example, a module with at least one gear being 0.1 mm or less) to enable device miniaturization. Specifically, it is possible to provide a gear train that can withstand practical use even if the above-noted gear reduction ratio is 400 or greater.

A gear train according to the present invention is easy to achieve even when a module of a combination of at least one gear of a gear form of the sun gear, the planetary gear, the fixed internal tooth gear, and the movable internal tooth gear is 0.1 mm or less. Normally in the prior art when a module is 0.1 mm or less, there are cases in which gear assembly is not possible if the phase, alignment, of meshing between the multiple planetary gears and the sun gear, fixed internal tooth gear, or movable internal tooth gear does not match because there is little tolerance when the gears mesh. By contrast, because meshing of the plural planetary gears of a gear train in accord with the present invention is always in the same phase, i.e. alignment, the gears can be reliably and easily assembled even if the module of at least one gear form is 0.1 mm or less.

In the present invention the fixed internal tooth gear is preferably formed integrally to the inside surface of a housing of the gear train. By forming the fixed internal tooth gear integrally to the inside surface of the housing, the parts count can be reduced and the overall gear train can be further miniaturized.

In the present invention the pitch diameter of the second gear part of the planetary gear is smaller than the pitch diameter of the first gear part. As a result of the pitch diameter of the second gear part being smaller than the pitch diameter of the first gear part according to the present invention, the pitch diameter of the fixed internal tooth gear mating with the second gear part can be reduced, and as a result the gear train can be yet further miniaturized when the fixed internal tooth gear is disposed inside the housing, and even more particularly when the fixed internal tooth gear is formed integrally to the inside surface of the housing.

It should be noted that each gear train according to the present invention is preferably configured as a drive device by integration with an electric motor such as a motor or other drive source. A gear mechanism that can be miniaturized and achieve a high gear reduction ratio as in this invention is extremely advantageous as a small drive device that can be built in to portable (electronic) devices. It is desirable for use as a portable drug dispensing device or a cell phone vibrator, for example.

DESCRIPTION OF A PREFERRED EMBODIMENT

Figure 1:
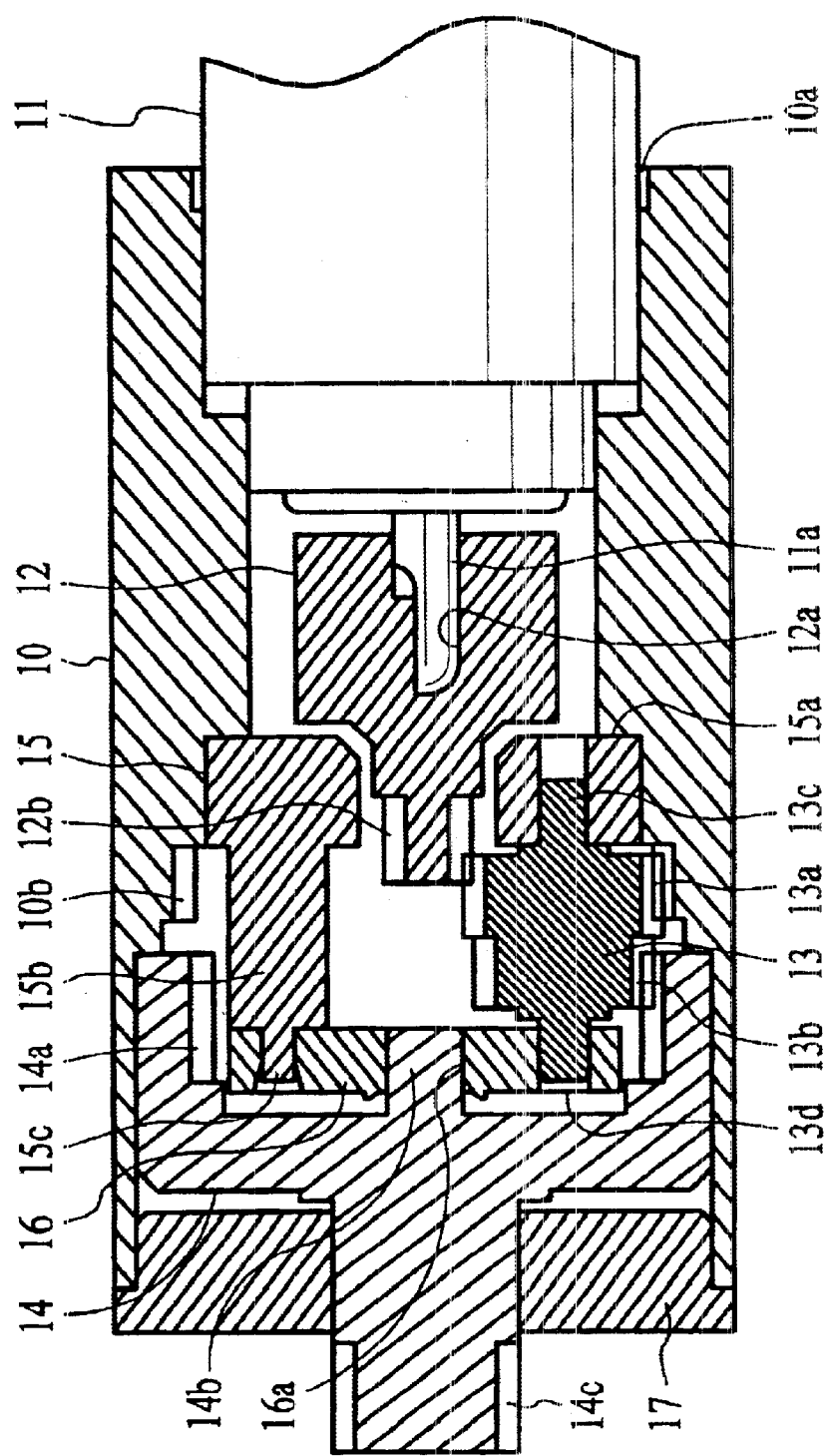
FIG. 1 is a longitudinal section view showing the configuration of a preferred embodiment of a gear train according to the present invention.

A preferred embodiment of a gear train according to the present invention is described below with reference to the accompanying figures. FIG. 1 is a longitudinal section view showing the internal structure of this preferred embodiment. A small motor 11 is fit into an opening at one end (the right end as seen in the figure) of a cylindrical housing 10 formed by injection molding, for example, and the body of this small motor 11 is fixed by adhesion to this housing 10 by flowing an adhesive into adhesive holder 10a. The output shaft 11a of the small motor 11 is fit into center hole 12a of input member 12. This input member 12 is also a resin molding, for example, formed by injection molding, for example. Sun gear 12b is integrally formed to an end of input member 12.

The sun gear 12b mates with planetary gear 13. The planetary gear 13 has a first gear part 13a meshing with sun gear 12b, a second gear part 13b formed coaxially to this first gear part 13a, a first axial support part 13c disposed at the end of the side having the first gear part 13a, and a second axial support part 13d disposed at the end of the side having the second gear part 13b. The first gear part 13a meshes with a fixed internal tooth gear 10b formed on the inside circumference surface of the housing 10. The second gear part 13b meshes with the movable internal tooth gear 14a of output member 14 disposed coaxially adjacent to the fixed internal tooth gear 10b. More specifically, it should be noted here that assembly is relatively simple when gear part 13a and gear part 13b have the same number of teeth, but when their tooth count is different the various conditions described further below become necessary. When their tooth count are not the same, assembly is not possible unless it is one can adjust the phase alignment of fixed internal tooth gear 10b, movable internal tooth gear 14a, and planetary gears 13.

The axial support part 13c is axially supported by annular part 15a formed as a ring on holder 15. More specifically, axial support part 13c is shoulder supported and is freely rotational in a fitting hole formed in annular part 15a. The holder 15 is a resin molding, for example, comprising the ring shaped annular part 15a, support stud 15b projecting from annular part 15a in the axial direction of the sun gear 12b (disposed so as to not interfere with rotation of planetary gear 13), and fitted part 15c formed on the end of support stud 15b. Axial support part 13d is supported by pressure holder 16 in which is fit fitted part 15c of holder 15. More specifically, axial support part 13d is shoulder supported and is freely rotational in a fitting hole formed in the pressure holder 16.

The holder 15 and pressure holder 16 form a single part as a result of fitting fitted part 15c and pressure holder 16 together. The outside surface of annular part 15a of holder 15 slides in contact with the inside surface of housing 10. An axial support part 16a (a round hole in the figure) formed on the pressure holder 16 is axially supported by 14b of output member 14.

The part of output member 14 where movable internal tooth gear 14a is formed is contained in housing 10, and is freely rotationally guided by the inside surface of housing 10. It is also freely, rotationally, and axially supported by a center hole in end case 17 fit into the housing 10. Output gear 14c of output member 14 is disposed projecting externally in the axial direction from end case 17.

Figure 2:
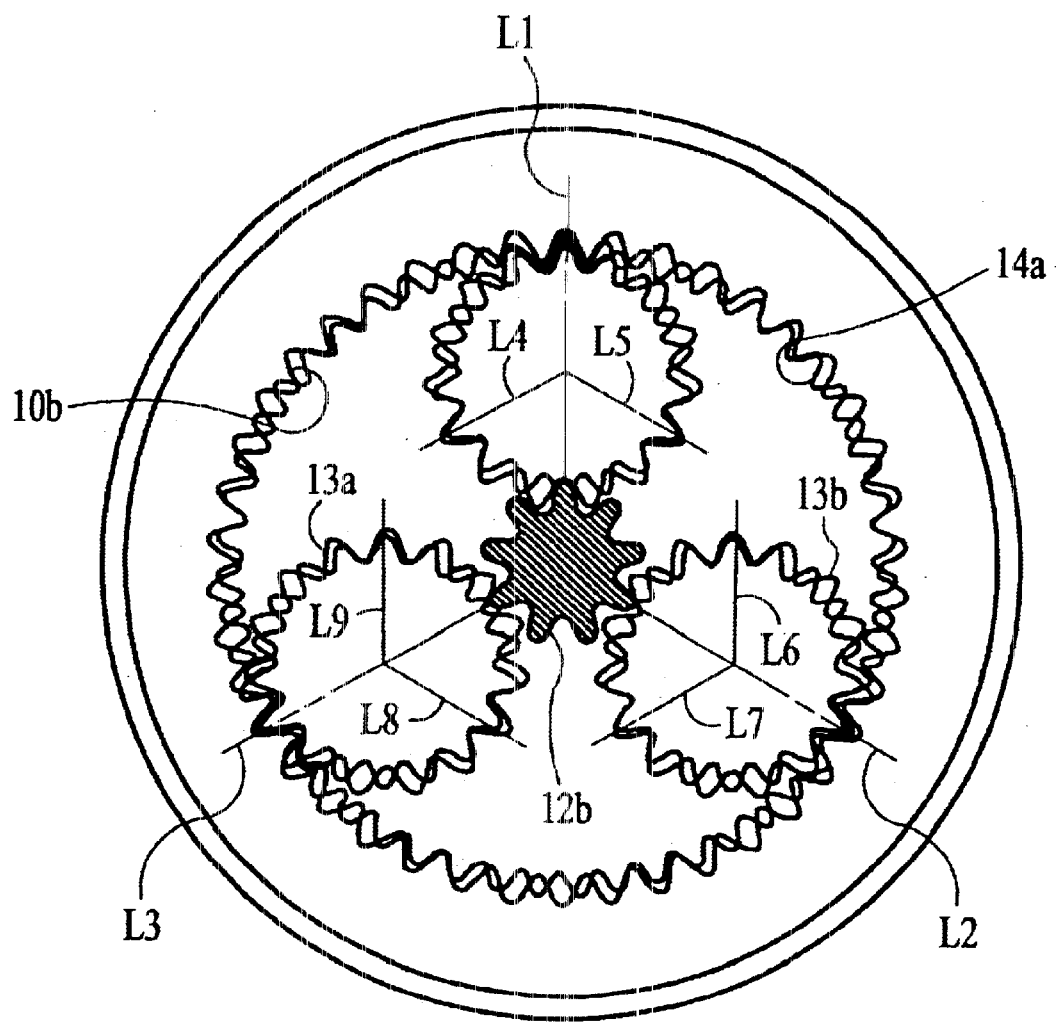
FIG. 2 is a projected planar view with the teeth of the main gears of the present gear train illustratively shown superimposed on each other.

In FIG. 2, an end view showing the meshing of the various gears in the present embodiment is shown in the axial direction with the gears illustratively shown superimposed on each other. Presently preferred tooth counts in this embodiment are as follows: the tooth count of sun gear 12b is e=9; the tooth count of the first gear part 13a of each of the three planetary gears is $z_1=15$; the tooth count of the second gear part 13b of each of the three planetary gears is $z_2=18$; the tooth count of the fixed internal tooth gear 10b is $I_1=42$; and the tooth count of the movable internal tooth gear 14a is $I_2=51$. The gear reduction ratio obtained from equation 1 in this case is 481. In the present embodiment all gear tooth counts e, $z_1$, $z_2$, $I_1$ and $I_2$ are a multiple of 3. Additionally the difference between $z_1$ and $z_2$, and the difference between $I_1$ and $I_2$, is also a multiple of 3. It is acceptable in this case if $z_1=z_2$ and $I_1=I_2$. Another possible example of the tooth counts in this embodiment is e=6, $z_1=12$, $z_2=15$, $I_1=39$, and $I_2=48$ (the gear reduction ratio being 480).

Figure 3A:
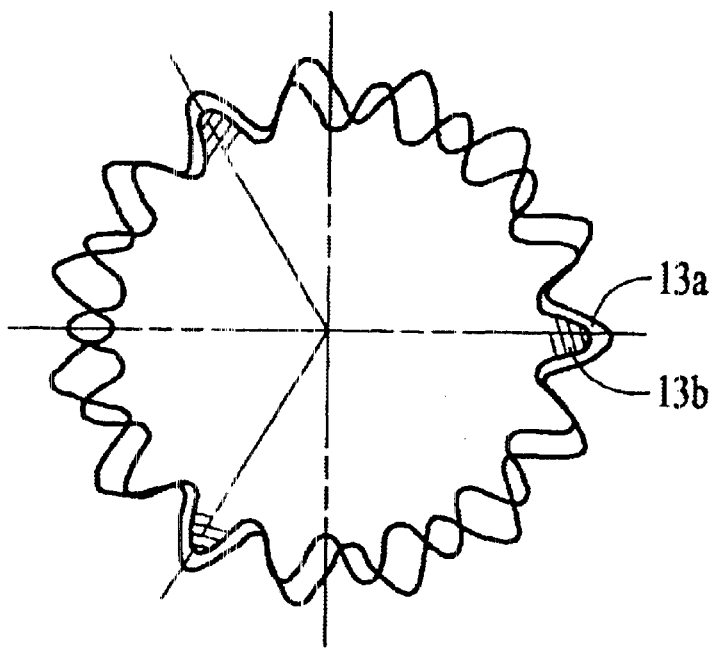
FIG. 3(a) is a projected planar view with the teeth of the planetary gear 13 of FIGS. 1 and 2 illustratively shown superimposed on each other, (b) is a projected planar view of a conventional planetary gear having equal tooth counts on both of its sections and showing the teeth of both sections in alignment, and (c) is a side view of a planetary gear in a preferred embodiment of the present invention.
Figure 3B:
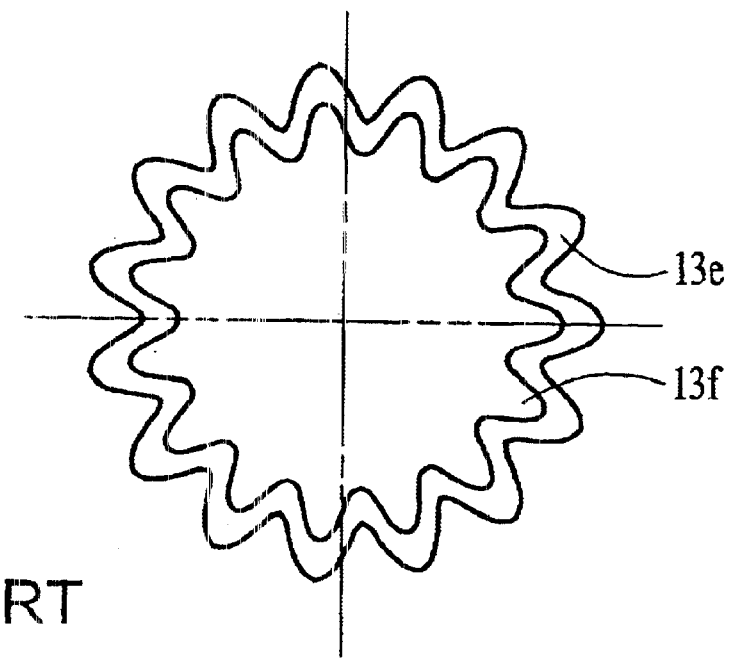
Figure 3C:
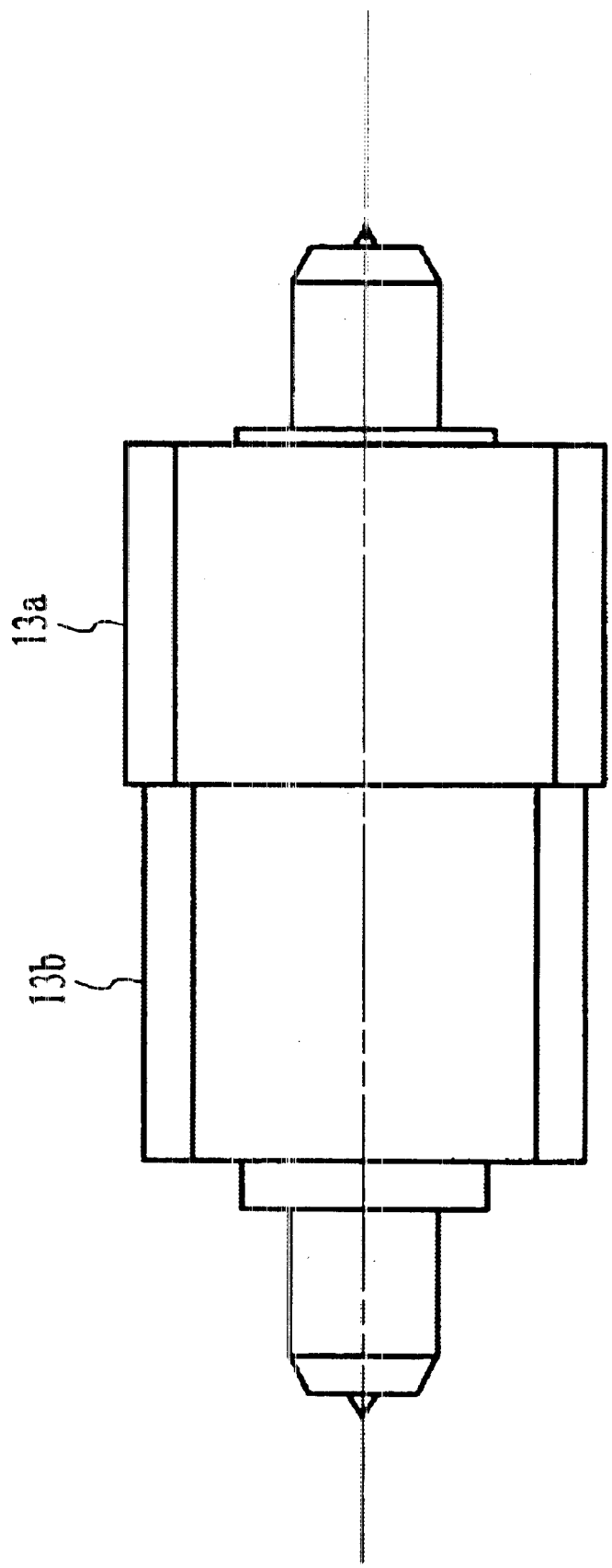

The planetary gear is described in further detail referring to FIG. 3. FIG. 3(b) is a planar view showing the alignment of conventional, i.e. z1=z2, gear forms 13e and 13f. FIG. 3(a) is a planar view showing the alignment of gear forms of the planetary gears 13a and 13b in accord with the present invention, and FIG. 3(c) is a side-sectional view of the planetary gears 13a and 13b in accord with the present invention. With a gear having conventional gear forms, such as where a first gear form 13e and another gear form 13f have the same phase, i.e. tooth alignment, processing methods for configuring the gear with two gear forms are relatively simple and can be selected from among numerous methods. For example, one gear form having a shaft and another gear form having a hole can be separately formed, and the shaft can then be driven into the hole of the other gear form to complete the planetary gear. Alternatively, separate injection molds can be made for the respective gear forms such that the gear forms separate at the parting line. The relative phase relationship is the same around the gear form circumference, and particularly high precision is therefore not required at the parting line when the molds are made. What should be noted here according to the present invention is that because the tooth counts of the gear forms in the present invention differ, there is no restricting condition concerning the relative relationship of the two gear forms, and if the tooth counts of 13a and 13b were 15 and 14, for example, the gear forms could be aligned at one tooth, as shown in any one of the three shaded parts in FIG. 3(a) but not at the other two shaded parts. If the gear forms do not align it will not be possible to assemble a planetary gear train mechanism using multiple two stage planetary gears because when the second stage is assembled after assembling the first stage, the phases, i.e. alignment, of the plural planetary gears and the subsequently assembled inner tooth gear will not match.

The present invention is characterized by setting both tooth counts to a number that is evenly divisible by 3 or 2 or 4 or any other number. As shown in FIG. 3(a), z1=15 and z2=18 are an example of tooth counts evenly divisible by 3. As will be evident from the figure, there are three tooth locations where the gear forms match using these tooth counts. As a result, even if three planetary gears are used, the second stage inner tooth ring can be assembled after the first stage is assembled. Furthermore, if the tooth counts of the configuration are 15 and 14 as in the previous example, the tooth phase, i.e. alignment, will not match at times when processing the planetary gears, and whether the gear forms are separately processed and then assembled or produced by injection molding, difficulty arises in either case with the degree of precision processing or phase matching when the parts are combined. However, with the tooth count settings of the present invention, there is less difficulty in the processing stage, in either parts processing or positioning, because there will always be at least two places somewhere on the circumference where the two gear forms match, i.e. have tooth alignment, and it is therefore easier to achieve. In fact, Applicants have succeeded in molding and easily assembling an ultra small planetary gear by injection molding tooth forms suitable for a clock, having gear stages of 15 teeth and 12 teeth, and joining them. Previously, there have been no planetary gear products or parts with different tooth counts achievable with injection molding at such an ultra small level, however the present invention permits the achievement of this ultra small configuration. In particular, the present invention enables the manufacture of such ultra small planetary gears by injection molding, which makes it extremely effective when it comes to making mass produced goods at low cost.

The reason why each gear has a tooth count that is a multiple of three is described next below. First, when the first gear parts 13a of the three planetary gears 13 disposed between the sun gear 12b and fixed internal tooth gear 10b are assembled at equal intervals (that is, at 120 degree intervals) in the circumferential direction, the three planetary gears can be reliably assembled in a synchronized meshed state by making the tooth forms of the sun gear and the tooth forms of the fixed internal tooth gear three times symmetrical (rotationally symmetric such that the same tooth forms are in phase, i.e. alignment, every 120 degrees) and making the tooth forms of the planetary gears also three times symmetrical. That is, if the mating positions of the sun gear and planetary gear, and the mating position of the planetary gear and the fixed internal tooth gear intersecting at line segments L1, L2, and L3 in FIG. 2 are in the same phase, i.e. alignment, for the three planetary gears (the mating state is the same, that is, for example, when the top land of one planetary gear and the bottom land of the fixed internal tooth gear mate, the top land of the planetary gear and the bottom land of the fixed internal tooth gear also mate at the mating positions of the other two planetary gears and fixed internal tooth gear, and likewise when the bottom land of one planetary gear mates with the top land of the sun gear, the bottom land of the planetary gears and the top lands of the sun gear also mate at the mating positions of the other two planetary gears and the sun gear), the sun gear, first gear part of the planetary gear, and fixed internal tooth gear can be reliably assembled. As a result, the gear forms of the sun gear and fixed internal tooth gear meshing with the three planetary gears must be three times symmetrical in the direction of rotation (that is, the tooth counts are a multiple of three), and because the gear form parts intersecting lines L1, L6, L9, and lines L5, L2, L8, and lines L4, L7, L3 in the figure must be gear forms having the same phase, i.e. alignment, as the first gear parts of the planetary gear, the gear forms of the first gear parts of the planetary gears must also be three times symmetrical in the direction of rotation (that is, the tooth counts a multiple of 3).

Furthermore, in order to assemble the movable internal tooth gear 14a to the second gear parts 13b of the planetary gear 13 when the sun gear 12b, first gear parts 13a, and fixed internal tooth gear 10b are assembled, the first gear part and coaxially formed second gear part, and the gear form of the movable internal tooth gear meshing with the second gear part must be formed to be three times symmetrical (that is, have tooth counts that are a multiple of 3). Because when thus formed each of the three planetary gears can be assembled in the same phase relationship to the mated parts, the gears can be reliably assembled in all cases. It should be noted that it is not necessary to form the gear forms of the first gear parts and second gear parts to the same tooth count and same phase in this case.

The gear reduction ratio is approximately 480 as noted above with the present embodiment, and a higher gear reduction ratio can be achieved than is possible with the prior art. More specifically, a gear reduction ratio of twice or more the gear reduction ratios of the concrete prior art examples having three planetary gears described above can be achieved. In addition, the tooth count (42) of the fixed internal tooth gear and the tooth count (51) of the movable internal tooth gear are both less than the tooth counts of the prior art fixed internal tooth gear tooth count (60) and the tooth count (61 to 64) of the movable internal tooth gear. Therefore, if gears having the same gear module are used, gears with a smaller overall outside diameter can be provided.

Because the diameter of the pitch circle is smaller in the second gear part 13b than in the first gear part 13a of each planetary gear 13 in the present embodiment, and as a result the pitch diameter of the movable internal tooth gear 14a also becomes smaller, the outside diameter can be made smaller without lowering the rigidity of the output member 14, the outside diameter of the housing 10 containing the output member 14 can also be reduced, and the size of the overall gear train can therefore be also reduced.

An alternative embodiment of the present invention having basically the same configuration is described next. In this embodiment two planetary gears are disposed as two at 180 degree intervals around the sun gear. In this case the sun gear tooth count e, planetary gear tooth counts $z_1$ and $z_2$, fixed internal tooth gear tooth count $I_1$, and movable internal tooth gear tooth count $I_2$ are all a multiple of 2. If, for example, e=12, $z_1$=14, $z_2$=12, $I_1$=40, and $I_2$=34, the gear reduction ratio obtained from equation 1 above will be 515.7. In this embodiment the first gear part and second gear part of the two planetary gears mesh at mutually the same phase with the sun gear or the fixed internal tooth gear or the movable internal tooth gear, as in the previous embodiment, and for the same reason the gears can be reliably assembled in all cases.

In each of the preceding embodiments the sun gear, first gear part and second gear part of the planetary gears, the fixed internal tooth gear, and the movable internal tooth gear all have a tooth count that is a multiple of the number of planetary gears. As a result, the same advantages as can basically be achieved in each of the above described embodiments. For example, when four planetary gears are disposed, it is only necessary to set the tooth count of every gear to a multiple of 4. However, because sufficient space between the planetary gears cannot be achieved and the section area of the support stud part projecting in the axial direction in the carrier made up of the above-noted holder and holder presser is reduced if the gear train is miniaturized, it becomes difficult to ensure the rigidity of the carrier, and it becomes necessary to configure the carrier using expensive, high rigidity materials in order to increase carrier rigidity. Therefore, the number of planetary gears is preferably two or three.

While the above-described preferred embodiments are constrained in that the tooth count of each gear is a multiple of the number of planetary gears, there is not the constraint that planetary gear tooth count $z_1=z_2$ as described in the above-cited Japanese Patent Laid-open Publication (kokai) H2-31047, and this invention therefore increases the degree of freedom in choosing the combination of gear tooth counts, a wider range of gears can be designed, and the gear reduction ratio can also be freely set. It is therefore possible to achieve a high gear reduction ratio when required without incurring an increase in the size of the mechanism.

A gear train as described in the above preferred embodiments of the invention can be configured with a motor as an integrated drive source as shown in FIG. 1. In addition, a configuration integrating the fixed internal tooth gear and housing is also preferable because the parts count is thereby reduced.

A gear train according to the above described preferred embodiments is preferably configured as a drive device by integration with a motor as noted above or other drive source. When the size of the drive source becomes smaller, the drop in the drive torque is usually relatively greater than the reduction in the size of the drive source. Therefore, when a small drive source is used, it is necessary to accelerate the drive source output and reduce the output with a high gear reduction ratio to assure the required torque. A gear train that is small and can achieve a high gear reduction ratio is needed in this case. A gear mechanism that can achieve a high gear reduction ratio with a size reduction as in these preferred embodiments of the invention is therefore extremely effective as a small drive device that can be assembled into portable (electronic) devices. For example, use as a drive device for a rotary or other type of fluid dispensing pump in a portable drug supply system is preferable.

It will be obvious that a gear train according to the present invention will not be limited to the above described examples shown in the figures, and includes alternative variations that are within the scope of and not departing from the intent of the present invention.

It will be known from the preceding description that the present invention can achieve a gear train that has high durability even if the size is reduced and can be easily and reliably assembled because the assembly state can be reliably achieved and an extremely well balanced planetary gear mechanism can be achieved. Furthermore, because there is only the constraint that the tooth count of each gear be a multiple of n, and the tooth counts of the first gear parts and the tooth counts of the second gear parts of the planetary gears are not required to be the same, the tooth count combinations can be set more freely and a high gear reduction ratio can be easily achieved. Moreover, because there are more than two planetary gears, the load on the gears is less compared with when only one planetary gear is used. Furthermore, that the possibility of manufacturing this type of planetary gear by injection molding has arisen is particularly advantageous in terms of using a planetary mechanism that can achieve ultra small products in large quantities at low cost.

What is claimed is:

1. A gear train comprising:

a sun gear with a tooth count e;

n planetary gears where n is a natural number of 2 or more, each planetary gear having a first gear part with a tooth count $z_1$ and a second gear part with a tooth count $z_2$, the first gear part of said planetary gears meshing with said sun gear;

a fixed internal tooth gear with a tooth count $I_1$ meshing with the first gear part of said planetary gears; and a movable internal tooth gear with a tooth count $I_2$ meshing with the second gear part of said planetary gears;

wherein tooth counts e, $z_1$, $z_2$, $I_1$ and $I_2$ are all multiples of n.

2. The gear train as described in claim 1, wherein n has a value equal to one of 2 and 3.

3. The gear train as described in claim 1, wherein said gear train has a gear reduction ratio of 200 or greater when said sun gear is an input and said movable internal tooth gear is an output.

4. The gear train as described in claim 1, wherein a module of at least one gear of a gear form of said sun gear, said planetary gear, said fixed internal tooth gear, and said movable internal tooth gear is 0.1 mm or less.

5. The gear train as described in claim 1, wherein a module of a gear form of said sun gear, said planetary gear, said fixed internal tooth gear, and said movable internal tooth gear is 0.1 mm or less.

6. The gear train as described in claim 1, wherein said fixed internal tooth gear is formed integrally to the inside surface of a housing of said gear train.

7. The gear train as described in claim 1, wherein the pitch diameter of the second gear part of said planetary gears is smaller than the pitch diameter of the first gear part of said planetary gears.

8. The gear train of claim 1, wherein $z_1$ is not equal to $z_2$.

9. The gear train of claim 8, wherein $z_1$ is greater than $z_2$.

10. The gear train of claim 1, wherein a gear reduction ratio r is defined as $r=\{1+(I_1/e)\}/\{1-(z_2/z_1)*(I_1/I_2)\}$.

* * * * *